United States Patent [19]
Hurd

[11] 3,821,342
[45] June 28, 1974

[54] METHOD FOR EXPANDING SYNTHETIC PLASTIC BEADS IN A FLUID BED

[75] Inventor: Stanley E. Hurd, Sunnyvale, Calif.

[73] Assignee: The Motch & Merryweather Machinery Company, Euclid, Ohio

[22] Filed: Aug. 8, 1972

[21] Appl. No.: 278,840

Related U.S. Application Data
[63] Continuation of Ser. No. 102,277, Dec. 29, 1970, abandoned.

[52] U.S. Cl. .............. 264/53, 34/57 C, 264/345, 264/DIG. 9, 432/15, 432/58
[51] Int. Cl. .................. B29c 25/00, B29d 27/00
[58] Field of Search ............... 264/51, 53, DIG. 9; 432/13, 15, 58; 34/57 R, 57 A, 57 C, 57 E; 260/2.5 B

[56] References Cited
UNITED STATES PATENTS

| | | | |
|---|---|---|---|
| 2,316,814 | 4/1943 | Schemm | 34/57 A UX |
| 2,629,938 | 3/1953 | Montgomery | 34/57 A UX |
| 3,394,463 | 7/1968 | Futer | 34/57 C |
| 3,418,724 | 12/1968 | Futer | 34/57 A X |
| 3,446,882 | 5/1969 | Landon | 264/51 X |
| 3,511,843 | 5/1970 | Lewis | 34/57 R X |
| 3,543,414 | 12/1970 | Gomarin | 34/57 R |
| 3,546,787 | 12/1970 | Horner et al. | 34/57 A |
| 3,691,644 | 9/1972 | Schnitzer | 34/57 X |

FOREIGN PATENTS OR APPLICATIONS
950,033 2/1964 Great Britain ............ 34/57 C

OTHER PUBLICATIONS
Stastny, Fritz, "Molds and Fixtures for Styropor Fabrication," (Translation) pp. 1,2,8–11 (from Forman und Vorrichtungen sur Verarbeitung Von Styropar, Reprint from Der Plastverarbeiter 5, No. 9, 12 pp.).

*Primary Examiner*—Philip E. Anderson
*Attorney, Agent, or Firm*—Patrick J. Walsh

[57] ABSTRACT

The fluid bed includes a plenum, a slotted plate overlying the plenum, and a chamber above the plate. Raw unexpanded beads are disposed in the chamber at one end thereof. Heated air is supplied the plenum and issues through the slots in the form of air jets having predominantly longitudinally directed flow components for distributing the raw beads along the plate and exposing the beads substantially uniformly to the heated air. The beads are fluidized by the heated air and expand due to the heating of the blowing agent impregnated in the beads. The expanded beads are carried to the top of the chamber by the fluidizing air and are discharged over an adjustable gate at the opposite end of the chamber.

6 Claims, 3 Drawing Figures

PATENTED JUN 28 1974

3,821,342

INVENTOR
STANLEY E. HURD

BY Patrick J. Walsh

ATTORNEY

METHOD FOR EXPANDING SYNTHETIC PLASTIC BEADS IN A FLUID BED

This application is a continuation of application Ser. No. 102,277, filed Dec. 29, 1970 and now abandoned.

The present invention relates to apparatus and methods for expanding synthetic plastic beads, for example, polystyrene beads containing a blowing agent such as pentane, Freon, etc., and particularly relates to apparatus and methods for expanding synthetic plastic beads in a fluidized bed.

Apparatus and methods for expanding synthetic plastic beads prior to disposing the expanded or partially expanded beads in a mold cavity are known. For example, it is a conventional practice to partially or fully expand the beads by subjecting raw beads to hot water or steam. In these practices, the beads are mechanically agitated during expansion in order to prevent the beads from sticking together and forming clumps and also to provide substantially uniform expansion. Also, the beads must be dried after expansion before fusing in a mold cavity. These hot water or steam practices have not been as effective as desired since the beads still tend to some extent to stick together and there is the necessary and additional step of aging the beads after expansion. Certain other prior art devices for expanding synthetic plastic beads utilize dry heated air as the medium for effecting expansion. One such prior art device includes a whirl-type expander. However, this type of unit has many disadvantages including the fact that the residence time in the drum is very difficult to control and is generally not as effective as desired.

The present invention provides apparatus and methods for expanding synthetic plastic beads which minimizes or eliminates many of the problems associated with prior apparatus and methods for expanding synthetic plastic beads and provides novel and improved apparatus and methods therefor having distinct advantages over such known apparatus and methods. Particularly, the present invention provides for expansion of synthetic plastic beads in a fluidized bed comprising an elongated plate having a plurality of directional slots opening through the plate. The plate defines the bottom of a chamber into which the raw beads are deposited and expanded and which overlies a plenum in communication with a source of heated air under pressure. In utilizing the apparatus and methods of the present invention, the raw unexpanded beads are fed into the chamber at one end thereof. The slots are configured such that the hot air passing from the plenum through the slots issues into the chamber in the form of air jets having predominantly longitudinally directed flow components paralleling the surface of the plate. The heated air jets fluidize the beads in the chamber and vaporize and expand the blowing agent, i.e., pentane, Freon, etc., impregnated in the raw beads to expand the latter. As the beads decrease in density and volumetrically expand, they are carried to the top of the bed by the fluidizing air. More particularly, the air jets directed substantially parallel to the plate distribute the raw beads along the bottom of the plate whereby the beads are uniformly exposed to the heated air supplied through the slots. The beads are also displaced in the direction of the air flow and a weir gate is provided at the downstream end of the chamber whereby the expanded beads carried to the top of the chamber by the fluidized air are discharged over the top of the gate. The gate is selectively adjustable in height whereby the residence time of the beads within the chamber can be readily controlled. Particular advantages of the foregoing described apparatus and methods are the reduction in the tendency of the beads to form clumps and stick together by virtue of the agitation provided the beads by the fluidizing air, the long residence time in the chamber which is readily controllable by adjusting the height of the weir gate whereby the density and volume of the expanded beads can be readily controlled and the production of expanded beads having substantially uniform density. Moreover, the device disclosed can be used continuously in contradistinction to a batch-type operation, is mechanically simple with few moving parts and is easy to clean.

Accordingly, it is a primary object of the present invention to provide novel and improved apparatus and methods for expanding synthetic plastic beads.

It is another object of the present invention to provide apparatus and methods for expanding synthetic plastic beads in a fluid bed.

It is still another object of the present invention to provide novel and improved apparatus and methods for expanding synthetic plastic beads to a relatively uniform density.

It is still another object of the present invention to provide apparatus and methods for expanding synthetic plastic beads wherein the residence time of the beads while expanding and the density of the resulting expanded beads are readily and easily controllable. It is a related object of the present invention to provide apparatus and methods for expanding synthetic plastic beads at a relatively low temperature on the order of 185°–205° F.

It is a further object of the present invention to provide apparatus and methods for expanding synthetic plastic beads wherein discrete expanded beads are provided in contradistinction to clumps of beads.

It is a still further object of the present invention to provide apparatus and methods for expanding synthetic plastic beads in a fluidized bed wherein the raw beads are exposed uniformly to heated air in the bed.

These and further objects and advantages of the present invention will become more apparent upon reference to the following specification, claims, and appended drawings, wherein:

Figure 1:
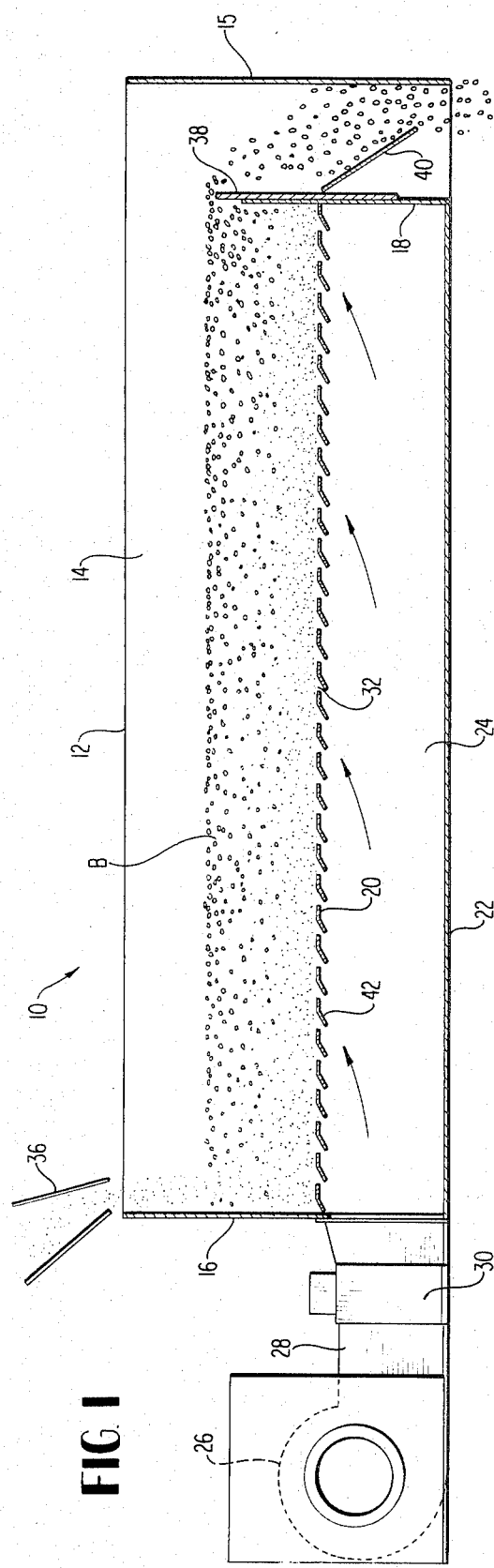
FIG. 1 is a vertical cross sectional view of the apparatus employed in expanding synthetic plastic beads in accordance with the present invention.

Referring now to the drawings, particularly to FIG. 1, there is illustrated a fluid bed generally illustrated 10 comprising an elongated housing 12 having upstanding side walls 14 and end walls 15 and 16 and an upstanding wall 18 between side walls 14 and longitudinally spaced from end wall 15. An elongated, substantially horizontally disposed slotted plate 20 is secured intermediate the heights of walls 14, 16 and 18 and defines with a bottom wall 22 a plenum 24. A blower 26 at one end of fluid bed 10 provides air under pressure through a transition duct 28 containing a heater 30 into plenum 24. As described in detail hereinafter, the air under pressure in plenum 24 issues through a plurality of slots 32 formed in plate 20 and emerges therefrom as air jets for fluidizing synthetic plastic beads B disposed in the chamber 34 above plate 20 and defined by the upper portions of side walls 14, end wall 16 and wall 18. A chute 36 is disposed adjacent one end of chamber 34 for delivering the raw, unexpanded synthetic plastic beads into the chamber. At the opposite end of the chamber, there is provided a weir gate 38 over which the expanded beads flow for discharge through a chute 40 defined in part by end wall 15 and end portions of side walls 14.

Figure 2:
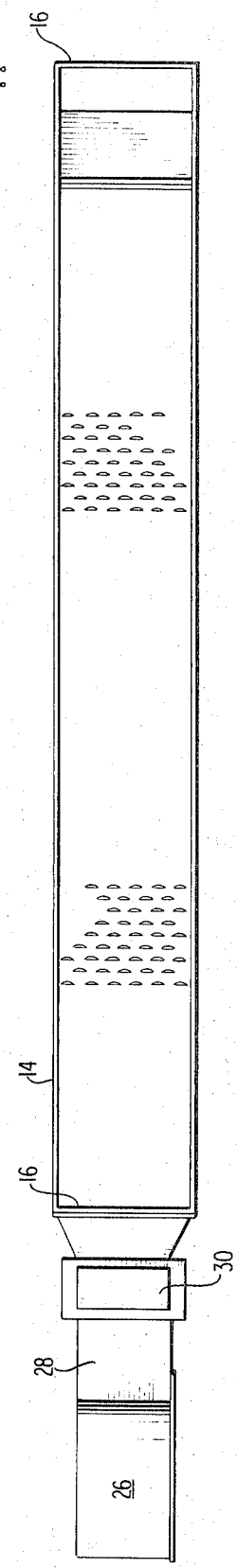
FIG. 2 is a plan view thereof.
Figure 3:
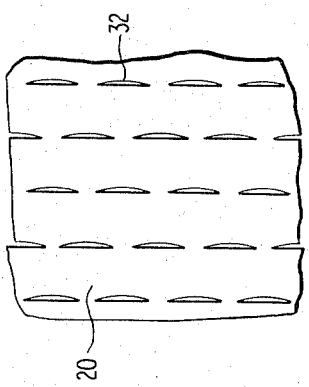
FIG. 3 is an enlarged fragmentary plan view of directional slots utilized in the apparatus illustrated in FIG. 1.

The slots 32 in plate 20 are utilized for directing air jets substantially longitudinally along the upper side of plate 20 and toward the discharge end of the fluid bed 10. That is to say, slots 32 are specifically configured such that the air issuing therethrough and into chamber 34 forms air jets having predominantly horizontally extending flow components. To this end, the slots are particularly formed by incising plate 20 in a transverse direction at longitudinally spaced positions therealong and depressing the portion 42 of plate 20 downstream from the incisions. Depressed portions 42 form baffles for directing heated air from plenum 24 such that the air jets issuing through the slots 32 formed by the upstream edges of portions 42 and the incisions in plate 20 have predominantly horizontally extending flow components. Further, the slots are arranged in plate 20 such that the air jets issuing therethrough distributes the raw beads along the upper surface of plate 20 and in the direction of flow of the beads from the inlet end of chamber 34 to its discharge end. As will be seen from FIGS. 2 and 3, the slots are particularly arranged in longitudinally staggered rows, i.e., a herringbone pattern, whereby substantially the entirety of the upper side of plate 20 is swept by the air jets. In this manner, the beads in chamber 34 are uniformly exposed to the heated air jets supplied through plate 20 along the full length of fluid bed 10.

In operation, the raw unexpanded beads are deposited via chute 36 on plate 20 at one end of the chamber. The heated air supplied plenum 24 and emerging through slots 32 into chamber 34 as hot air jets distributes the raw unexpanded beads along the upper surface of plate 20 substantially uniformly. The beads are thus individually exposed to the hot air. The movement and agitation of the beads along plate 20 permits the heated air to envelop the beads in the chamber. The heated air vaporizes and expands the blowing agent, i.e., pentane, Freon, etc., impregnated in the raw beads to expand the latter at substantially a uniform rate. As the beads decrease in density and volumetrically expand, they are displaced in an upward direction by the small vertical flow component of the air jets and longitudinally displaced toward the discharge end of fluid bed 10, their places being filled at the bottom of chamber 34 by the raw beads being deposited into the chamber through chute 36. As the beads decrease in density and volumetrically expand, they are carried to the top of the bed and toward discharge chute 40 by the fluidizing air and, when fully expanded, flow over weir gate 38 for discharge through chute 40.

It is an important feature hereof that the residence time of the beads in the chamber can be selectively controlled. This can be accomplished by selectively adjusting the height of weir gate 38 and by controlling the rate of input of raw beads to the chamber. By controlling the residence time, the beads may be expanded at a relatively low temperature, for example, on the order of 185°–205° F. This is significant as expansion of the beads within this relatively low temperature reduces the tendency of the beads to stick together during expansion and this, coupled with the agitation provided the beads by the air jets issuing into chamber 34 virtually precludes the formation of clumps of beads stuck one to the other. It will be readily appreciated that by selectively controlling residence time, control over the density and volume of the expanded beads is obtained. Also, by properly controlling the residence time, expanded beads having substantially uniform density may be obtained.

The foregoing described apparatus and methods provides for continuous expansion of synthetic plastic beads, i.e., the raw beads may be continuously disposed in chamber 34 via chute 36 and discharged therefrom via chute 40. This is in contradistinction to batch type operations. Also, it will be noted that the disclosed apparatus and methods employs relatively few moving parts and those moving parts which are employed are confined to substantially trouble free units such as the blower and the weir gate. Also, the device is relatively simple to clean, and with the use of air jets obtains a self-cleaning action.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by U.S. Letters Patent is:

1. A method of expanding synthetic plastic beads comprising the steps of delivering expandable synthetic plastic beads containing a liquid volatilizable organic blowing agent to a fluid bed chamber defined by upstanding confronting side walls, a rear wall, a vertically adjustable front wall, and by a deck plate having perforations therein for directing heated air jets having predominately horizontally extending flow components into the chamber, directing heated air through said perforated deck to provide heated air jets having predominately horizontally extending flow components for distributing the beads along the deck plate, expanding the beads due to vaporization of the blowing agent, agitating the expanding beads and fluidizing the beads within the chamber whereby the expanded beads are carried to the top of the chamber, and selectively adjusting the residence time of the beads within the chamber whereby expanded beads of the desired density and volume are obtained.

2. The method according to claim 1 including the step of substantially continuously supplying the raw beads to the chamber.

3. The method according to claim 2 including the step of substantially continuously discharging the expanded beads from the chamber.

4. The method according to claim 1 including the step of discharging the expanded beads over said vertically adjustable front wall by gravity action.

5. The method according to claim 1 including the step of supplying heated air in a manner to expand the beads at a temperature within a range of 185°–205° F.

6. The method according to claim 1 wherein the beads are polystyrene beads and including the step of varying the rate of input of raw beads to the chamber and the rate of discharge of expanded beads from the chamber such that the beads lie in residence in the chamber on the order of about 30 minutes.

* * * * *